April 27, 1965     F. E. J. THOLEY     3,181,152
MULTI-MODE NAVIGATION APPARATUS
Filed April 25, 1963
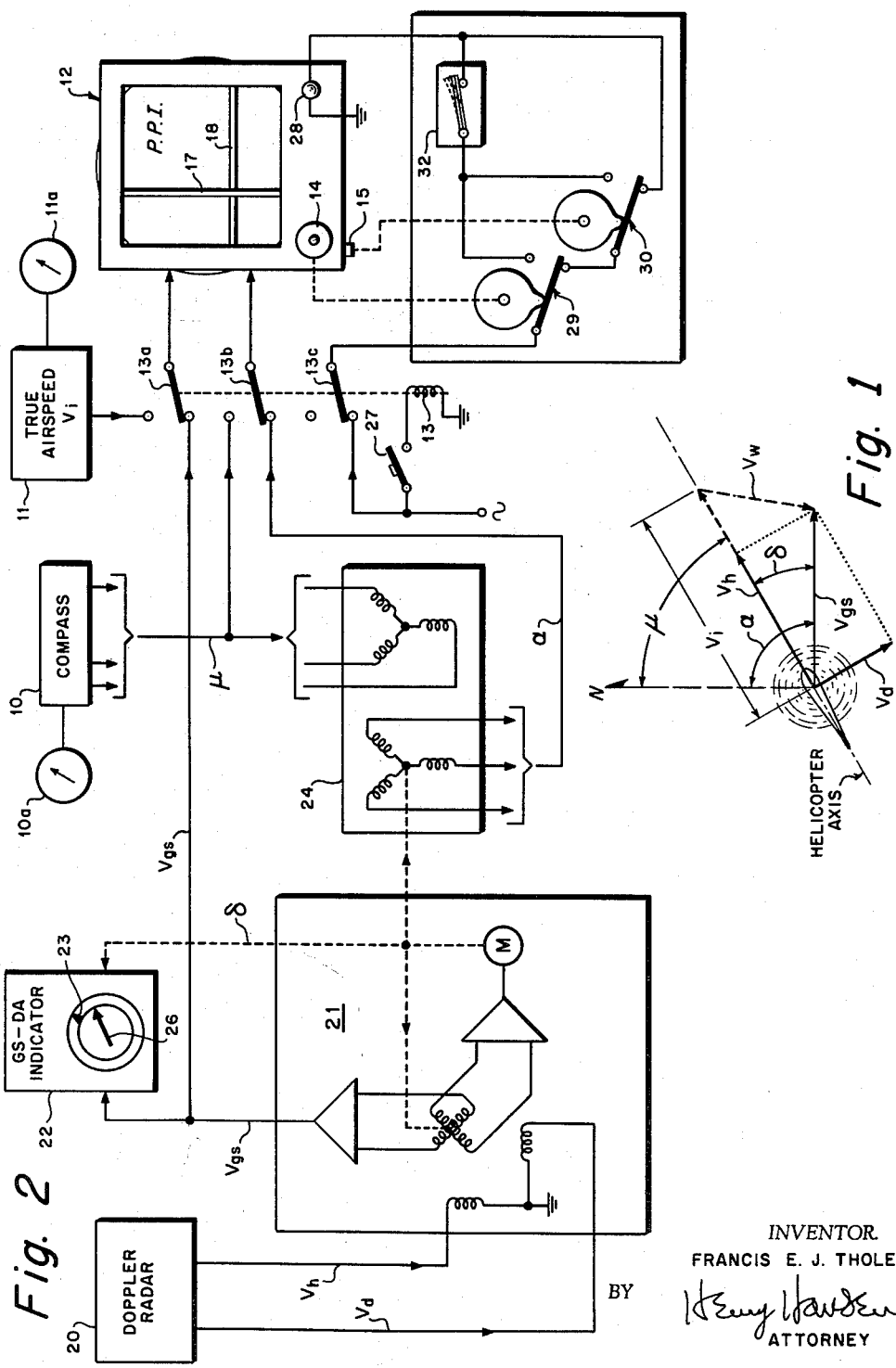
*INVENTOR.*
FRANCIS E. J. THOLEY
BY
ATTORNEY

United States Patent Office 3,181,152
Patented Apr. 27, 1965

3,181,152
MULTI-MODE NAVIGATION APPARATUS
Francis E. J. Tholey, Hatboro, Pa., assignor to the United States of America as represented by the Secretary of the Navy
Filed Apr. 25, 1963, Ser. No. 276,140
6 Claims. (Cl. 343—9)
(Granted under Title 35, U.S. Code (1952), sec. 266)

The invention described herein may be manufactured and used by or for the Government of the United States of America for governmental purposes without the payment of any royalties thereon or therefor.

The present invention relates to navigational tracking and display apparatus for a vehicle and more particularly to a multi-mode navigational display apparatus capable of operation with either dead reckoning or Doppler-radar input information.

The dead reckoning mode of navigational display commonly utilizes airspeed and magnetic heading as its input parameters. These parameters are treated in a computing mechanism along with automatically computed or manually set wind information to yield a continuously moving visual display of a vehicle's geographical position. In some vehicles the dead reckoning mode is unreliable. For instance, in a helicopter, the air mass measuring transducer which generates a signal according to airspeed must operate in turbulently disturbed air caused by helicopter rotor downwash. At low helicopter speeds, say below forty knots, the airspeed transducer acts erratically and is entirely unreliable and impractical. Some other mode of tracking and display immune to air turbulence is required.

The Doppler-radar mode of ground speed measurement is generally accepted as a good alternative for the air mass measuring transducers. Air disturbances have no effect. However, separate and distinct display instruments have been necessarsy because the Doppler-radar output parameters, such as from the Navy's AN/APN 97A Doppler Set, are entirely different from those available from conventional dead reckoning transducers. High costs and limited instrument panel space in helicopters and similarly instrumented vehicles have heretofore prohibited the use of both the dead reckoning and Doppler-radar navigation modes as known in the prior art.

Accordingly, it is an object of the present invention to provide a novel integrated Doppler radar and dead reckoning tracking and display apparatus for a vehicle in which the Doppler-radar and dead reckoning measurements are harmonized for compatible operation of a single plan position indicator or PPI.

Another object of the invention is to provide an improved multi-mode navigation tracking and display system for helicopters performing at either high or low speeds in which a Doppler-radar and dead reckoning mode may be quickly and easily interchanged for operation of a single plan position indicator, and in which the interchanging is accomplished with maximum reliability and substantially uninterrupted tracking.

Still another object of the invention is to provide an improved multi-mode navigational tracking and display apparatus which employs a dead reckoning mode plan position indicator for both Doppler-radar and air mass information with a relatively small addition of inexpensive instrumentation components.

Various other objects and advantages will appear from the following description of one embodiment of the invention, and the most novel features will be particularly pointed out hereinafter in connection with the appended claims.

In the drawings:

FIG. 1 is a graphical representation of the velocity vectors of interest in connection with the present invention as applied to an aircraft in flight; and FIG. 2 represents a schematic wiring diagram, partially in block form, of one embodiment of the present invention.

In the illustrated embodiment, the navigation tracking and display apparatus is shown in a normal mode utilizing Doppler-radar measurements as the primary navigational parameters. However, for convenience of explanation of the invention, the alternative dead-reckoning mode will be discussed first since it is this mode which forms the criteria necessary to modify the Doppler-radar parameters to obtain compatibility. In the dead-reckoning mode of operation, the aircraft speed vector $V_{gs}$ of FIG. 1 is defined by the true heading angle $\mu$ as generated by a synchro-transmitter contained in a compass 10 and a true airspeed signal $V_i$, as generated by another synchro-transmitter in an airspeed transducer 11. These output signals are fed to a plan position indicator 12 through normally open contacts of relay switches 13a and 13b. Matching synchro-receivers contained in the indicator 12 receive these electrical inputs and operate a polar-to-rectangular components resolver. A wind vector $V_w$ is manually set into the indicator 12 at the knobs 14 and 15, representing wind velocity and direction, respectively. Another vector components resolver converts this wind vector $V_w$ into rectangular components. Corresponding components of the vectors $V_i$ and $V_w$ are algebraically combined to produce the normal, rectangular components of the ground speed vector $V_{gs}$. These components are each integrated and the result thereof proportionately drive normally disposed cursors 17 and 18. The cursor intersection therefore represents a ground track of the aircraft. A more detailed description of such an indicator is disclosed in U.S. Patent No. 2,993,643 to P. G Holt for "Pilot's Automatic Dead Reckoning Equipment," issued July 25, 1961

The normal mode of operation obtains a ground speed measurement from a Doppler-radar unit 20. In some conventional Doppler-radar systems, such as in the Navy's AN/APN 97A Doppler Set, two output voltages are presented which are proportional to the ground speeds along the aircraft heading axis, and perpendicular to that axis. These speeds are represented as vectors $V_h$ and $V_d$, respectively. Since the plan position indicator 12 receives the aircraft airspeed in polar-coordinate form, the component ground speeds $V_h$ and $V_d$ are combined in a rectangular-to-polar components composer 21. The resultant vector computed by the component vectors $V_h$ and $V_d$ will be the ground speed vector $V_{gs}$. The velocity appears as an electrical signal and the azimuth appears as a shaft position at the output of the composer 21. This vector $V_{gs}$ is the same ground speed vector if computed by the above-described dead reckoning mode of operation wherein airspeed $V_i$ and wind $V_w$ are utilized instead. The angle subtended by the ground speed vector $V_{gs}$ and the aircraft heading is a drift angle $\delta$. The Doppler-radar measured ground speed $V_{gs}$ feeds into both a Ground Speed-Drift Angle or GS-DA indicator 22 and a normally closed contact of the relay switch 13a. The indicator 22 visually displays the ground speed $V_{gs}$ by the pointer 23, and the signal passing through the switch 13a operates the synchro-receiver in the indicator 12 in the same manner described above for a signal from the airspeed transducer 11.

The drift angle $\delta$ at the output of the composer 21 is drivingly connected to a drift angle or DA pointer 26 in the GS-DA indicator 22 for visual display, and to a rotor winding of a differential transformer 24. The aircraft heading $\mu$ obtained from the compass 10 also connects to a stator winding of the transformer 24, and an electrical output from the rotor winding represents a ground track angle α, shown vectorially in FIG. 1. The electrical output from the transformer 24 is connected through a normally closed contact of the relay switch 13b to the same synchro-receiver of the indicator 12 as described in connection with the standby dead-reckoning mode of operation.

*Doppler-radar to dead reckoning*

In order to switch from the normal Doppler-radar mode to the standby dead reckoning mode, a manual selector switch 27 is closed to energize a relay coil 13 having an armature which moves relay switches 13a and 13b to their normally open contacts thereby transferring the inputs at the indicator 12 from the composer 21 and the transformer 24 to the compass 10 and the airspeed transducer 11. The selection may also be accomplished automatically upon failure of one of the modes. Wind information must then be set into the indicator 12 at the wind setting knobs 14 and 15 and may be based on local weather information radioed to the pilot or may be easily determined by the pilot utilizing the information already displayed on the instrument panel. The manner by which the pilot can compute wind will be understood by reference to the vector diagram of FIG. 1. From compass and true airspeed indicators 10a and 11a in the aircraft, the true airspeed vector $V_1$ can be drawn to scale relative to true North. Then the ground speed vector $V_{gs}$ may be drawn relative to the airspeed vector $V_1$ from the readings of ground speed GS and drift angle DA on the indicator 22. The vector forming a closed triangle is therefore the wind $V_w$. Measuring the azimuth and length of the wind vector $V_w$, the inputs for knobs 14 and 15 are thusly determined. It is contemplated that conventional memory devices may be added at the outputs of the composer 21 for storing the last valid measurements of ground speed and drift angle on the indicator 22 obtained prior to switching from Doppler-radar to dead reckoning operation.

*Dead reckoning to Doppler-radar*

When it is desired to switch back from the alternative or standby dead reckoning to the Doppler-radar mode by opening the manual selector switch 27, it is imperative that all wind settings be removed at the knobs 14 and 15 to obtain an accurate ground track on the indicator 12. To remind the pilot to execute this step, a tell-tale light 28 is provided on the indicator 12 which flashes on and off in the normal mode of operation until the wind settings have been completely removed; then the light will glow steadily. This is accomplished by an additional relay switch 13c operated by the relay coil 13. An electrical power supply is thereby connected through cam switches 29 and 30, the armature of which is normally positioned so that it is electrically connected in series to the light 28 when the wind knobs 14 and 15 are at their zero settings. In these positions, as illustrated in FIG. 2, the switches 29 and 30 permit the light 28 to glow continuously to indicate correct ground tracking during Doppler-radar operation. Should it occur that either knob 14 or 15 was not turned back to its zero setting, the cam switches 29 and 30 will direct the electrical supply through a thermal switch 32 now in series with the light 28. As illustrated, the switch 32 may comprise a bi-metal armature which deflects open due to the heat rise caused by electric current therethrough. The switch 32 of course will close again when there is no current flow, and the deflection will be cyclically repeated to produce flashing of the light 28.

Some of the many novel features and attendant advantages of the invention should now be apparent. For example, the multi-mode navigation ground tracking and display apparatus as disclosed and claimed herein provides a navigation capability heretofore unknown in Doppler-radar and dead reckoning equipment of entirely different navigation parameters. The two distinct modes of navigation have been hereby made compatible for alternative use by a novel harmonizing and combining system which permits the use of conventional and already-installed navigation equipment used in aircraft and other vehicles. The combining system embodies a concept of harmonizing the navigational parameters for a single plan position indicator or similar display apparatus utilizing a minimum number of parts, and which is both reliable and inexpensive to manufacture and assemble. The present invention is particularly useful in helicopters wherein the conventional dead reckoning or air-mass mode of speed measurement is unreliable at low speeds due to air disturbances caused by the rotor. In such instances, the Doppler-radar mode can be quickly and easily substituted using a single plan position indicator.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A multi-mode navigation tracking and display apparatus for a helicopter comprising, in combination:

a Doppler-radar unit having two output signals indicative of component ground speeds respectively along the helicopter axis and normal thereto, a composer having two inputs connected to said Doppler-radar unit for receiving the component ground speed output signals and for transposing them into two output signals indicative respectively of the ground speed along the helicopter ground track and of the drift angle formed thereby, a compass having an output signal indicative of the helicopter heading, differential means having two inputs connected respectively to said composer and said compass for receiving respectively the drift angle output signal and the helicopter heading, said differential means algebraically combining the input signals thereto into an output signal indicative of the ground track angle, an airspeed transducer having an output signal indicative of the true airspeed of the helicopter, a plan position indicator having two inputs adapted respectively to receive the true airspeed output signal and the helicopter heading output signal, said plan position indicator further including means for manually inserting wind velocity and wind azimuth settings therein, switch means connected to said indicator for selectively connecting the inputs thereto to the ground speed and ground track angle output signals or to the true airspeed and helicopter heading output signals, and tell-tale light means operatively connected to said selector switch means and to said indicator wind inserting means for indicating the settings of the latter when said ground speed and ground track output signals are connected to said indicator;

whereby Doppler-radar or dead reckoning operation may be quickly and easily effected with substantially uninterrupted tracking and display of the helicopter's position.

2. Apparatus as set forth in claim 1 wherein said tell-tale light means further comprises:

cam switches operatively connected to said wind inserting means, and intermittent electrical contacting means, said cam switches and contacting means being connected in electrical series;

whereby said light flashes when said wind setting means has not been returned to the zero setting.

3. A multi-mode navigation tracking and display apparatus for an aircraft comprising, in combination:

a Doppler-radar unit having two output signals indicative of component ground speeds respectively along the aircraft axis and normal thereto, a composer having two inputs connected to said Doppler-radar unit for receiving the output signals and for transposing them into two output signals indicative respectively of the ground speed along the aircraft ground track and of the drift angle formed thereby, a compass having an output signal indicative of the aircraft heading, differential means having two inputs connected respectively to said composer and said compass for receiving respectively the drift angle output signal and the aircraft heading, said differential means algebraically combining the input signals thereto into an output signal indicative of the ground track angle, an airspeed transducer having an output signal indicative of the true airspeed of the aircraft, a plan position indicator having two inputs adapted respectively to receive the true airspeed output signal and the aircraft heading output signal, said plan position indicator further including means for manually inserting wind velocity and wind azimuth settings therein, and switch means connected to said indicator for selectively connecting the inputs thereto to the ground speed and ground track angle output signals or to the true airspeed and aircraft heading output signals;

whereby Doppler-radar or dead reckoning operation may be quickly and easily effected with substantially uninterrupted tracking and display of the aircraft's position.

4. A multi-mode navigation tracking and display apparatus for an aircraft comprising, in combination:
   a Doppler-radar unit for generating component ground speed signals along the aircraft axis and normal thereto,
   a composer connected to said Doppler-radar unit for transposing the ground signals into a ground speed signal along the aircraft ground track and a drift angle signal,
   a compass having an aircraft heading output signal,
   differential means connected to receive the drift angle and aircraft heading signals and producing a ground track angle output signal,
   an airspeed transducer having a true airspeed output signal,
   a plan position indicator adapted to receive the true airspeed and aircraft heading output signals, and including means for manually inserting wind information therein,
   switch means selectively connecting the indicator inputs to the ground speed and ground track angle output signals or to the true airspeed and aircraft heading output signals, and
   tell-tale light means operatively connected to said selector switch means and to said indicator wind inserting means for indicating the settings of the latter when said ground speed and ground track output signals are connected to said indicator;
   whereby Doppler-radar or dead reckoning operation may be quickly and easily effected with substantially uninterrupted tracking and display of the aircraft's position.

5. Apparatus as set forth in claim 4 wherein said tell-tale light means further comprises:
   cam switches operatively connected to said wind inserting means, and
   intermittent electrical contacting means,
   said cam switches and contacting means being connected in electrical series;
   whereby said light flashes when said wind setting means has not been returned to the zero setting.

6. A multi-mode navigation tracking and display apparatus for a vehicle comprising, in combination:
   ground speed responsive means having two output signals indicative of the ground speed respectively along the vehicle axis and normal thereto,
   transposing means for producing output signals indicative of the ground speed along the vehicle ground track and of the drift angle formed thereby,
   vehicle heading responsive means,
   combining means connected to said transposing means and said heading responsive means for producing a signal indicative of the ground track angle,
   true airspeed responsive means,
   indicator means adapted to receive the true airspeed signal and the heading signal and including means for manually inserting wind velocity and wind azimuth settings therein, and
   switch means selectively connecting the indicator means to the ground speed and ground track angle signals or to the true airspeed and heading signals.

References Cited by the Examiner
UNITED STATES PATENTS

| | | | |
|---|---|---|---|
| 2,865,019 | 12/58 | Harrison | 343—9 |
| 2,993,643 | 7/61 | Holt | 343—7 |

CHESTER L. JUSTUS, *Primary Examiner.*